United States Patent
Wang et al.

(10) Patent No.: US 9,298,235 B2
(45) Date of Patent: Mar. 29, 2016

(54) ELECTRONIC DEVICE AND POWER CONTROL MODULE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Ya-Guo Wang, Shenzhen (CN); Chun-Ching Chen, New Taipei (TW)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 165 days.

(21) Appl. No.: 14/251,006

(22) Filed: Apr. 11, 2014

(65) Prior Publication Data

US 2014/0325244 A1    Oct. 30, 2014

(30) Foreign Application Priority Data

Apr. 29, 2013   (CN) .......................... 2013 1 0155074

(51) Int. Cl.
*G06F 1/26*   (2006.01)

(52) U.S. Cl.
CPC ........................................ *G06F 1/26* (2013.01)

(58) Field of Classification Search
None
See application file for complete search history.

(56) References Cited

U.S. PATENT DOCUMENTS

| | | | | |
|---|---|---|---|---|
| 6,115,313 A * | 9/2000 | Pio | ......................... | G11C 5/143 365/185.33 |
| 2006/0212137 A1* | 9/2006 | Sone | ....................... | G06F 1/263 700/22 |
| 2010/0080057 A1* | 4/2010 | Reuter | ................... | G11C 5/143 365/185.04 |

* cited by examiner

*Primary Examiner* — Paul Yanchus, III
(74) *Attorney, Agent, or Firm* — Novak Druce Connolly Bove + Quigg LLP

(57) ABSTRACT

An electronic device includes a power supply, a power consuming module, and a power control module. The power control module includes a capacitor, a detecting unit, and a control unit. A first end of the capacitor is connected to the power supply. Another end of the capacitor is grounded. The control unit includes a switching element. When the electronic device is powered on, the detecting unit controls the switching element to turn off, and the power supply supplies power to the power consuming module to charge the capacitor. When the electronic device is powered off, the capacitor discharges to supply power to the power consuming module. The detecting unit detects whether data storage of the electronic device is completed. When the data storage is completed, the detecting unit controls the switching element to turn on, causing the capacitor to discharge to ground. A power control module is also provided.

8 Claims, 1 Drawing Sheet

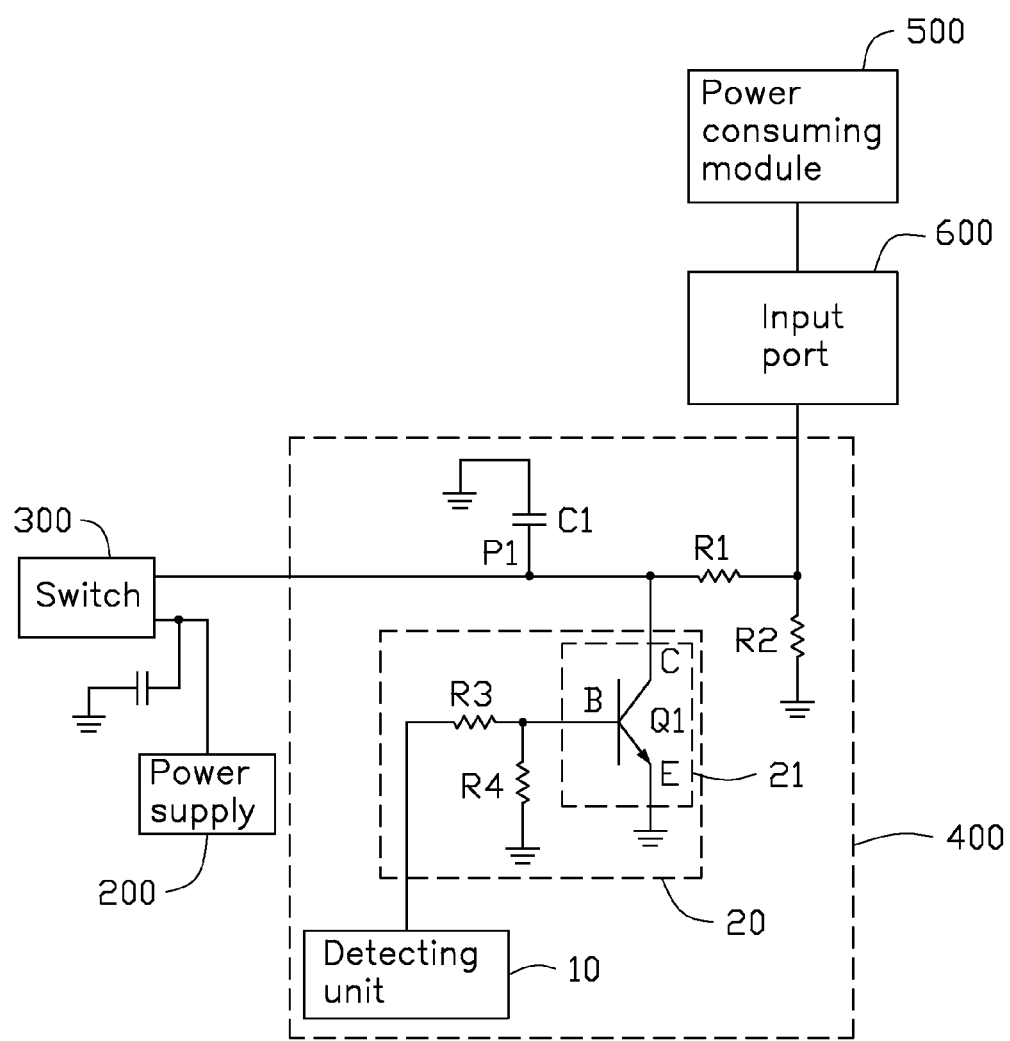

ELECTRONIC DEVICE AND POWER CONTROL MODULE

FIELD

The present disclosure relates to electronic devices, and particularly to an electronic device with a power control module.

BACKGROUND

When an electronic device (e.g. a multimedia player) is shut down, a power supply unit of the electronic device will continue to supply power to the electronic device to ensure that data is updated before the electronic device is shut down completely.

BRIEF DESCRIPTION OF THE DRAWINGS

Many aspects of the present disclosure should be better understood with reference to the following drawing. The components in the drawing are not necessarily drawn to scale, the emphasis instead being placed upon clearly illustrating the principles of the present device. Moreover, in the drawing, like reference numerals designate corresponding components throughout the view.

The FIGURE is a circuit diagram of an embodiment of an electronic device with a power control module, in accordance with an exemplary embodiment.

DETAILED DESCRIPTION

The disclosure is illustrated by way of example and not by way of limitation in FIGURE of the accompanying drawing in which like references indicate similar elements. It should be noted that references to "an" or "one" embodiment in this disclosure are not necessary to the same embodiment, and such references mean "at least one." The references "a plurality of" and "a number of" mean "at least two."

Embodiments of the present disclosure are described with reference to the accompanying drawing.

The FIGURE shows an exemplary embodiment of an electronic device 100. The electronic device 100 can include a power supply 200, a switch 300, a power control module 400, a power consuming module 500, and an input port 600. The power consuming module 500 includes a number of electronic elements to be powered, for example storages, indicator lights, and the like. In this embodiment, the electronic device 100 is a multimedia player. In another embodiment, the electronic device 100 can be a mobile phone, a tablet computer, a portable computer, or the like.

The power supply 200 is electrically connected to the input port 600 via the switch 300, and the input port 600 is further electrically connected to the power consuming module 500. When the switch 300 is turned on by a user, the electronic device 100 is powered on, and the power supply 200 supplies power to the input port 600. The power consuming module 500 receives power via the input port 600. When the switch 300 is turned off by the user, the electronic device 100 is powered off, and the power supply 200 stops supplying power to the input port 600 and the power consuming module 500.

The power control module 400 is electrically connected between the switch 300 and the input port 600. In this embodiment, the power control module 400 includes a capacitor C1, a detecting unit 10, a control unit 20, a first resistor R1, and a second resistor R2. The first resistor R1 is electrically connected between the switch 300 and the input port 600. A first end P1 of the capacitor C1 is electrically connected to the first resistor R1 and the switch 300. Another end of the capacitor C1 is grounded. The second resistor R2 is electrically connected between the input port 600 and ground.

The control unit 20 includes a switching element 21 electrically connected between the first end P1 of the capacitor C1 and the ground.

The detecting unit 10 is electrically connected to the switching element 21. The detecting unit 10 is used to detect whether the electronic device 100 is powered on or powered off. When the detecting unit 10 detects that the electronic device 100 is powered on, the detecting unit 10 outputs a first control signal to the switching element 21 to control the switching element 21 to turn off. Simultaneously, because the switch 300 is turned on when the electronic device 100 is powered on, the capacitor C1 is charged by the power supply 200 via the switch 300. When the detecting unit 10 detects that the electronic device 100 is powered off, the detecting unit 10 further detects whether data needed to be stored is stored completely. In this embodiment, the data needed to be stored can be a play list, a play schedule, and the like. In this embodiment, a method for the detecting unit 10 detecting whether the data is finished being stored includes the following: the detecting unit 10 adds all the data to be stored into a queue list, deletes data from the queue list when the data is stored completely, and determines that all of the data are stored completely when the queue list is empty.

When the detecting unit 10 detects that the data is not stored completely, the detecting unit 10 continues to output the first control signal to the switching unit 10 to keep the switching element 21 turned off. Thus, the capacitor C1 is discharged to power the power consuming module 500 via the input port 600. When the detecting unit 10 detects that the data is stored completely, the detecting unit 10 outputs a second control signal to the switching element 21 to control the switching element 21 to turn on. Thus, the capacitor C1 is discharged to ground via the switching element 21, and stops supplying power to the power consuming module 500. Therefore, the electronic device 100 in the present disclosure can adjust a time of supplying power to the power consuming module 500 after the electronic device 100 is powered off according to time required to store the data completely.

In this embodiment, the switching element 21 is a negative-positive-negative (NPN) transistor. The control unit 20 further includes a third resistor R3 and a fourth resistor R4. A base B of NPN transistor is electrically connected to the detecting unit 10 via the third resistor R3. The fourth resistor R4 is electrically connected between the base B of the NPN transistor and ground. An emitter E of the NPN transistor is grounded. A collector C of the NPN transistor is electrically connected to the first end P1 of the capacitor C1.

When the detecting unit 10 detects that the electronic device 100 is powered on, the detecting unit 10 outputs a low-level voltage to the base B of the NPN transistor, thus turning off the NPN transistor, and the capacitor C1 is charged by the power supply 200.

When the switch 300 is operated by the user to power off the electronic device 100, the power supply 200 stops supplying power to the power consuming module 500. Thus, the capacitor C1 is discharged. A discharged current from the capacitor C1 flows through the first resistor R1 and the second resistor R2, thereby generating a voltage on the second resistor R2. The voltage is applied to the power consuming module 500 via the input port 600 to power the power consuming module 500. Thus, the power consuming module 500 receives power to stay on and finish storing the data.

When the detecting unit 10 detects that the data is stored completely, the detecting unit 10 outputs a high-level voltage to the base B of the NPN transistor, thus turning on the NPN transistor, the capacitor C1 is directly discharged to ground. Thus, no current flows through the first resistor R1 and the second resistor R2, and the resistor R2 stops supplying voltage for the power consuming module 500. Thus, the power consuming module 500 is turned off accordingly.

In other embodiments, the switching element 21 can be a positive-negative-positive (PNP) transistor or a MOSFET.

Although the present disclosure has been specifically described on the basis of exemplary embodiments thereof, the disclosure is not to be construed as being limited thereto. Various changes or modifications may be made to the embodiments without departing from the scope and spirit of the disclosure.

What is claimed is:

1. An electronic device comprising:
   a power supply configured to supply power;
   a switch electrically connected to the power supply;
   an input port electrically connected to the power supply via the switch;
   a power consuming module electrically connected to the input port; and
   a power control module electrically connected between the switch and the input port, the power control module comprising:
      a first resistor electrically connected between the switch and the power consuming module;
      a capacitor, a first end of the capacitor being electrically connected to the switch and the first resistor, another end of the capacitor being grounded;
      a second resistor electrically connected between the input port and ground;
      a control unit comprising a switching element electrically connected between the first end of the capacitor and the ground; and
      a detecting unit electrically connected to the switching element, wherein the detecting unit is configured to detect whether the electronic device is powered on or powered off; when the detecting unit detects that the electronic device is powered on, the detecting unit outputs a first control signal to the switching element to control the switching element to turn off, thus the power supply supplies power to the power consuming module via the input port and the capacitor is charged by the power supply; when the detecting unit detects that the electronic device is power off, the detecting unit further detects whether data needed to be stored is stored completely, when the detecting unit detects that the data is not stored completely, the detecting unit continues to output the first control signal to the switching element to keep the switching element turned off, thus the capacitor is discharged to supply power to the power consuming module via the input port; if the detecting unit detects that the data is stored completely, the detecting unit outputs a second control signal to the switching element to control the switching element to turn on, thus the capacitor is discharged to ground via the switching element, and stops supplying power to the power consuming module via the input port.

2. The electronic device as described in claim 1, wherein the switching element is a transistor, a base of the switching element is connected to the detecting unit, an emitter of the switching element is grounded, and the collector of the switching element is connected to the first end of the capacitor.

3. The electronic device as described in claim 2, wherein the switching element is a negative-positive-negative transistor, the first control signal outputted by the detecting unit is a low-level voltage, the switching element is turned off when the base of the switching element receiving the first control signal; the second control signal outputted by the detecting unit is a high-level voltage, the switching element is turned on when the base of the switching element receiving the second control signal.

4. The electronic device as described in claim 1, wherein a method for the detecting unit detecting whether the data is finished being stored comprises the following: the detecting unit adds all the data to be stored into a queue list; deletes data from the queue list when the data is stored completely, and determines that all of the data are stored completely when the queue list is empty.

5. A power control module applied in an electronic device, the electronic device comprising:
   a power supply;
   a switch;
   an input port electrically connected to the power supply via the switch; and
   a power consuming module electrically connected to the input port, the power control module being electrically connected between the switch and the input port;
   the power control module comprising:
      a first resistor electrically connected between the switch and the power consuming module;
      a capacitor, a first end of the capacitor being electrically connected to the switch and the first resistor, another end of the capacitor being grounded;
      a second resistor electrically connected between the input port and ground;
      a control unit comprising a switching element electrically connected between the first end of the capacitor and the ground; and
   a detecting unit electrically connected to the switching element, wherein the detecting unit is configured to detect whether the electronic device is powered on or powered off; when the detecting unit detects that the electronic device is powered on, the detecting unit outputs a first control signal to the switching element to control the switching element to turn off, thus the power supply supplies power to the power consuming module via the input port and the capacitor is charged by the power supply; when the detecting unit detects that the electronic device is power off, the detecting unit further detects whether data needed to be stored is stored completely, when the detecting unit detects that the data is not stored completely, the detecting unit continues to output the first control signal to the switching element to keep the switching element turned off, thus the capacitor is discharged to supply power to the power consuming module via the input port, when the detecting unit detects that the data is stored completely, the detecting unit outputs a second control signal to the switching element to control the switching element to turn on, thus the capacitor is discharged to ground via the switching element and stops supplying power to the power consuming module via the input port.

6. The power control module as described in claim 5, wherein the switching element is a transistor, a base of the switching element is connected to the detecting unit, an emitter of the switching element is grounded, and the collector of the switching element is connected to the first end of the capacitor.

7. The power control module as described in claim 6, wherein the switching element is a negative-positive-negative transistor, the first control signal outputted by the detecting unit is a low-level voltage, the switching element is turned off when the base of the switching element receiving the first control signal; the second control signal outputted by the detecting unit is a high-level voltage, the switching element turns on when the base of switching element receiving the second control signal.

8. The power control module as described in claim 5, wherein a method for the detecting unit detecting whether the data is finished being stored comprises the following: the detecting unit adds all the data to be stored into a queue list; deletes data from the queue list when the data is stored completely, and determines that all of the data are stored completely when the queue list is empty.

* * * * *